United States Patent [19]
Oh et al.

[11] Patent Number: 5,781,696
[45] Date of Patent: Jul. 14, 1998

[54] SPEED-VARIABLE AUDIO PLAY-BACK APPARATUS

[75] Inventors: Yung Hwan Oh; Yeon Jun Kim, both of Taejon; Jum Han Bae, Suwon, all of Rep. of Korea

[73] Assignee: Samsung Electronics Co., Ltd., Kyungki-Do, Rep. of Korea

[21] Appl. No.: 535,517

[22] Filed: Sep. 28, 1995

[30] Foreign Application Priority Data

Sep. 28, 1994 [KR] Rep. of Korea ............ 1994-24514

[51] Int. Cl.$^6$ ............................................. G01L 9/00
[52] U.S. Cl. .................. 395/2.79; 395/2.16; 395/2.15; 395/2.33
[58] Field of Search ........................... 395/2.91, 2.92, 395/2.19, 2.15, 2.17, 2.79, 2.16, 2.14, 2.42, 2.33; 381/63, 106

[56] References Cited

U.S. PATENT DOCUMENTS

| | | | |
|---|---|---|---|
| 4,164,626 | 8/1979 | Fette | 395/2.17 |
| 4,624,012 | 11/1986 | Lin et al. | 381/51 |
| 4,734,795 | 3/1988 | Fukami et al. | 360/8 |
| 4,783,807 | 11/1988 | Marley | 395/2.44 |
| 5,298,674 | 3/1994 | Yun | 84/616 |
| 5,365,592 | 11/1994 | Horner et al. | 395/2.59 |
| 5,375,188 | 12/1994 | Serikawa et al. | 395/2.24 |
| 5,457,769 | 10/1995 | Valley | 395/2.19 |

FOREIGN PATENT DOCUMENTS 4168499  6/1992  Japan ................. G10L 3/02

OTHER PUBLICATIONS

JAPIO abstract of JP57154607A; Dialog(R)File 347:JAPIO; (c) JPO & JAPIO

*Primary Examiner*—Allen R. MacDonald
*Assistant Examiner*—Vijay B. Chawan
*Attorney, Agent, or Firm*—Sughrue, Mion, Zinn, Macpeak & Seas, PLLC

[57] ABSTRACT

A speed-variable audio play-back apparatus which includes a pitch detecting circuit for separating speech source components and audio characteristics from an input audio signal, a pitch modulating unit for deleting selected ones of the separated speech source components or adding another speech source components to the separated speech source components depending on a play-back speed, thereby adjusting the length of the audio signal to be played back, a speech synthesizing circuit for synthesizing the speech source components and audio characteristics modulated by the pitch modulating unit, thereby outputting a speed-varied audio signal; and a main controller for controlling the above components in accordance with control signals externally applied thereto. With this arrangement, it is possible to play back audio stored in a storage medium at an adjusted speed while preventing degradation in tone color and loss of audio signals from occurring upon varying the play-back speed when the audio is played back by an apparatus such as a tape player, VTR, multimedia equipment, or computer, so that the played-back audio sounds like a person speaking quickly or slowly.

8 Claims, 4 Drawing Sheets

SPEED-VARIABLE AUDIO PLAY-BACK APPARATUS

BACKGROUND OF THE INVENTION

1. Field of the Invention

The present invention relates to a speed-variable audio play-back apparatus, and more particularly to a speed-variable audio play-back apparatus capable of playing back audio stored in a storage medium at an adjusted speed while preventing any degradation in tone color or loss of audio signals from occurring upon varying the play-back speed while the audio (speech) is played back by an audio play-back apparatus such as a tape player, VTR, multimedia equipment, computer and the like, so that the audio (speech) being played back can be heard as when a person speaks quickly or slowly.

2. Description of Related Art

In tape or video players, generally, the tone color of the audio varies when the play-back speed varies. When play-back is carried out at a high speed, the audio being played back is different from its original audio level, and it is heard as a "peep-peep" sound. At a low play-back speed, a sound typically called "loosened tape sound", is generated.

As a conventional method for preventing such phenomena, Japanese Patent Laid-open Publication No. Heisei 4-168499 (Jun. 16, 1992) discloses a method for partially playing back audio (speech) signals read by a memory buffer. In accordance with this method, when the play-back speed is doubled, audio (speech) signals read by the memory buffer are partially played back such that only one of its two successive time-slices is played back.

For example, if the phrase, "I go to school with Jane", is played back at a double speed using the above-mentioned conventional method, components of the original audio respectively corresponding to the shaded portions shown in FIG. 1 are eliminated, so that only the speech "I to with Jane" is played back.

Since the conventional method plays back only part of the speech at a higher play-back speed so as to keep the tone color of the speech, the original meaning of the speech is lost. As a result, it is very difficult to understand the meaning of the speech using the conventional play-back apparatus. Furthermore, it makes listeners feel uncomfortable.

SUMMARY OF THE INVENTION

Therefore, an object of the invention is to solve the above-mentioned problem and to provide a speed-variable audio play-back apparatus capable of playing back audio stored in a storage medium at an adjusted speed while preventing any degradation in tone color and loss of audio signals from occurring upon varying the play-back speed while the audio (speech) is played back by an audio play-back apparatus such as a tape player, VTR, multimedia equipment, computer and the like, so that the audio (speech) being played back can be heard as when a person speaks quickly or slowly.

In accordance with the present invention, this object is accomplished by providing a speed-variable audio play-back apparatus comprising: a pitch detecting circuit for separating speech source components and audio characteristics from an input audio signal; a pitch modulating unit for deleting selected ones of the separated speech source components or adding another speech source component to the separated speech source components depending on a play-back speed, thereby adjusting the length of the audio signal to be played back; a speech synthesizing circuit for synthesizing the speech source components and audio characteristics modulated by the pitch modulating unit, thereby outputting a speed-varied audio signal; and a main controller for controlling the circuits and unit in accordance with control signals externally applied thereto, respectively.

It is preferred that the pitch detecting circuit be provided with an analog/digital converter for converting the analog input audio signal into a digital audio signal so that the pitch detecting circuit detects pitch portions of the audio signal in a digital manner.

It is also preferred that the speech synthesizing circuit be provided with a digital/analog converter for converting the audio signal, conversion-processed in a digital manner, into an analog signal.

Preferably, the apparatus further comprises a memory unit for temporarily storing the initial audio signal and sending the stored audio signal to the speech synthesizing circuit so that the audio signal is compared with the modulated audio signal synthesized by the speech synthesizing circuit.

It is also preferred that the apparatus further comprises a command memory circuit for storing various control signals required for a speed-varied audio play-back, receiving control signals from the main controller and outputting the stored control signals respectively based on the received control signals.

It is also preferred that the pitch detecting circuit extracts the speech source components on the basis of the following equation:

$$c(m, \delta) = \sum_{n=0}^{N-1} |x(n + t(m-1)) - x(n + tm + \delta)|$$

where, x(n): the original input signal (the amount of speech on a time axis n);

tm: the position of the m-th speech source; and

δ: a tolerance region around tm.

Preferably, the pitch modulating unit performs a signal modulation by applying a window function, which provides a required signal length extending from the position of each speech source, to a portion of the audio signal corresponding to each audio signal characteristic as expressed by the following equation:

$$x_m(n) = h_m(tm-n)x(n)$$

where, $x_m(n)$ : the modulated audio signal;

$h_m(n)$: the window function;

$t_m$: the position of each speech source; and x(n): the input audio signal (the amount of speech on a time axis n).

Preferably, the speech source synthesizing circuit derives a speed-varied speech signal by use of the modulated speech source components and audio signal characteristics as expressed by the following equation:

$$x(n) = \frac{\sum_q \alpha_q x_q(n) h_q^2(t_q - n)}{\sum_q h_q^2(t_q - n)}$$

where, x(n): the speed-varied speech signal;

$\alpha_q$: a variable for adjusting the amount of synthesized speech;

3 xq(n): the modulated audio characteristics (xq(n)=$x_m$(n−δq));

tq: the position of each modulated speech source; and

δq: a variable for determining the play-back speed;

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 2:
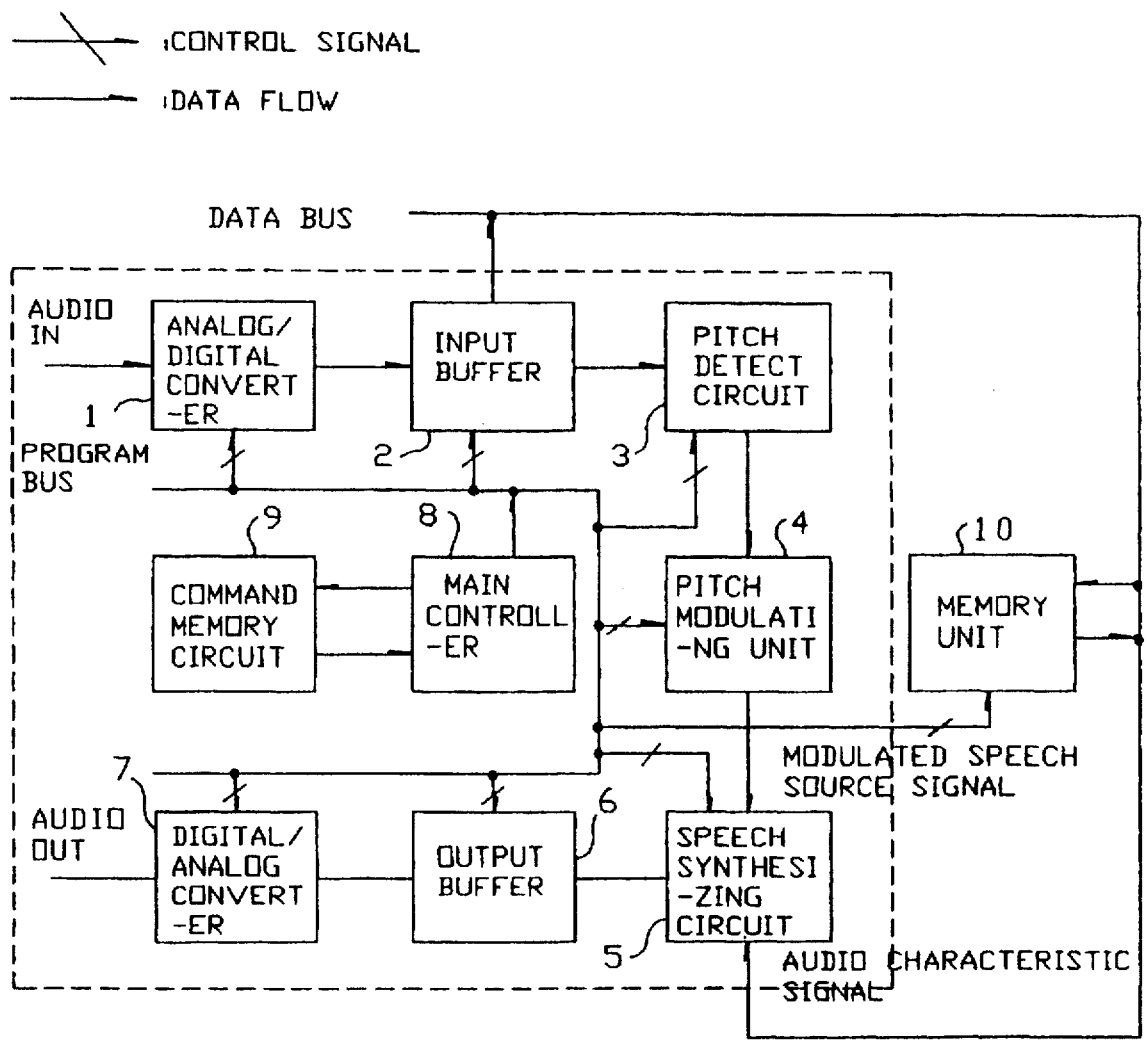
FIG. 2 is a block diagram schematically illustrating a speed-variable audio play-back apparatus in accordance with the present invention.

FIG. 2 is a block diagram schematically illustrating a speed-variable audio play-back apparatus in accordance with the present invention.

As shown in FIG. 2, the apparatus includes an analog/digital (A/D) converter 1 connected to an audio-in line and a program bus. An input buffer 2 is connected to the A/D converter 1. The input buffer 2 is also coupled to a data bus as well as the program bus. The apparatus further includes a pitch detecting circuit 3 connected to both the input buffer 2 and the program bus, a pitch modulating unit 4 connected to both the pitch detecting circuit 3 and the program bus, and a speech synthesizing circuit 5 connected to the pitch modulating unit 4. The speech synthesizing circuit 5 is also coupled to both the program bus and the data bus. The apparatus also includes an output buffer 6 connected to both the speech synthesizing circuit 5 and the program bus, a digital/analog (D/A) converter 7 connected to both the output buffer 6 and the program bus, a main controller 8 connected to the program bus, a command memory circuit 9, such as read only memory (ROM), connected to the main controller 8, and a memory unit 10, such as random access memory (RAM), connected to both the program bus and the data bus.

The main controller 8 serves to control the overall system of the speed-variable audio play-back apparatus. Command languages required to control various parts by the main controller 8 are stored in the command memory circuit 9. On the other hand, audio data is stored in the memory unit 10.

Transfer of control signals and transfer of data among the blocks are carried out by the program bus and data bus, respectively. The program bus serves to transfer a command from the main controller 8 to a part to be controlled. The data bus serves to receive audio data from the input buffer 2 and to temporarily store the received audio signal. Upon a speech synthesis, the data bus sends the stored audio data to the speech synthesizing circuit 5 so that the audio data can be re-synthesized with a modulated speech source signal in the speech synthesizing circuit 5.

Operation of the speed-variable audio play-back apparatus having the above-mentioned arrangement according to the present invention will now be described.

The system used in the apparatus according to the present invention is based on a speech production model which simulates a speaker's vocal organ. In accordance with the speech production model, the audio is determined by an audio transfer characteristic obtained by a speech source, which is an audio production source, and an articulation organ such as a tongue, a lip, or teeth.

In accordance with the speech production model, a flow of air emerging from the speaker's lungs generates periodic or noisy air vibrations in "a narrow space" defined in the voice cord or oral cavity by the tongue, lip, or teeth; that is, at the point of articulation. These air vibrations become a speech source. The frequency component of the speech source is selectively resonated by the influence of the audio transfer characteristic determined by the articulation of an organ positioned above the voice cord, namely, the vocal tract, thereby producing speech.

Figure 1:
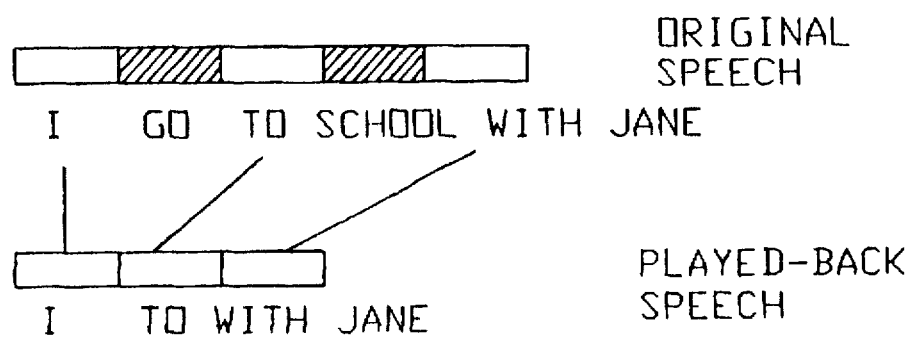
FIG. 1 is a diagram for explaining a conventional speed-variable speech play-back system.
Figure 3:
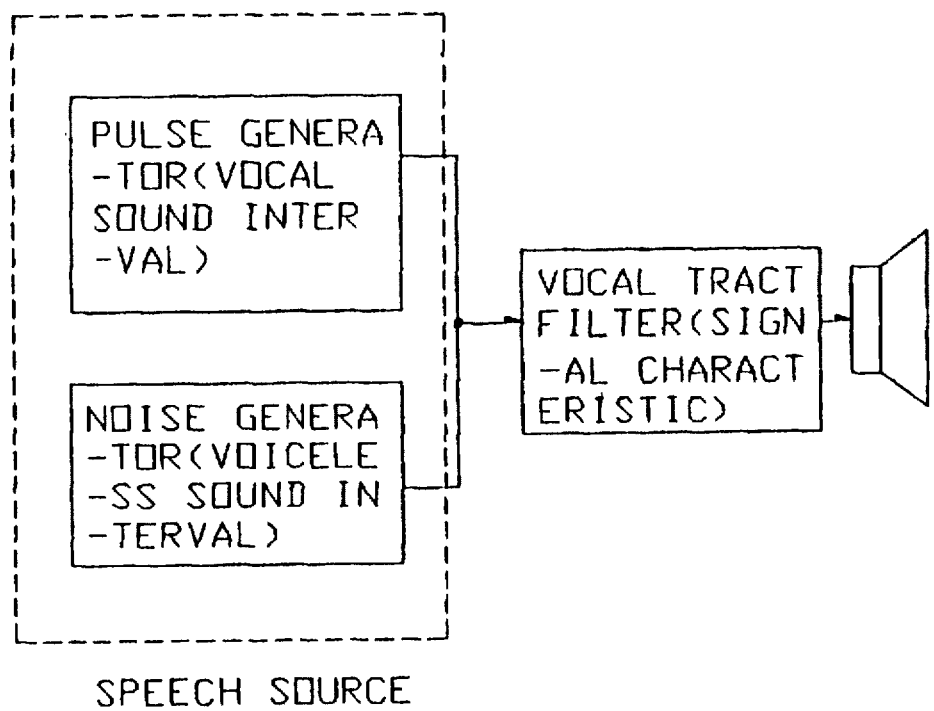
FIG. 3 is a block diagram illustrating a speech production model, applied to the present invention, in the form of an electronic circuit.

Referring to FIG. 3, such a speech production model is schematically shown in the form of an electronic circuit.

Figure 4:
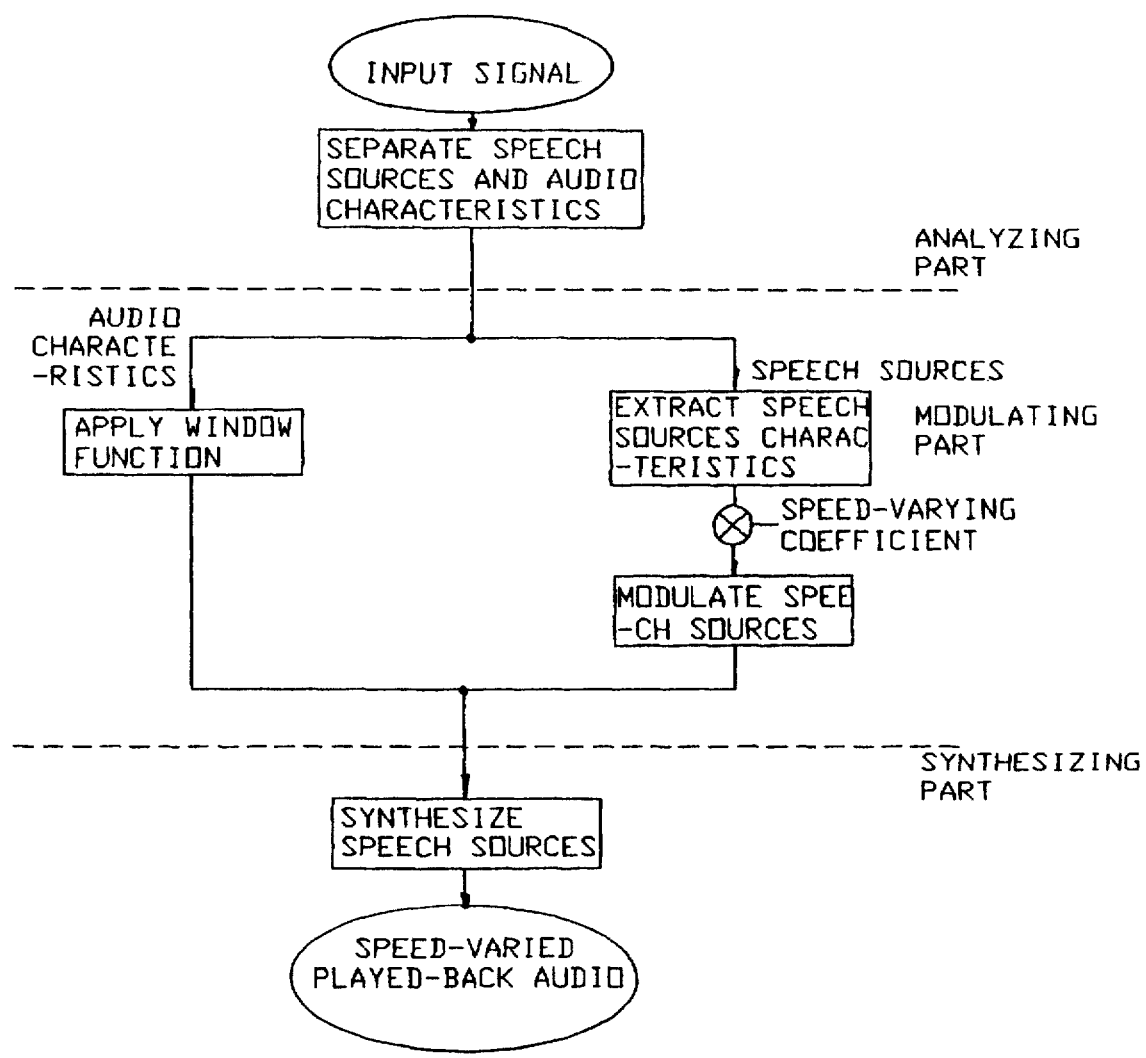
FIG. 4 is a flow chart illustrating signal processing procedures respectively executed by main parts of the speed-variable audio play-back apparatus shown in FIG. 2.

This system shown in FIG. 3 is based on the above-mentioned speech production model. As shown in FIG. 4, the system includes three main parts, namely, an analyzing part for separating speech sources and audio characteristics from an input signal, a modulating part for processing the separated signals at the desired play-back speed, and a synthesizing part for performing a signal re-synthesis using the modulated signals.

The modulating part includes a speech source modulating unit adapted to process the separated speech source signals based on the above-mentioned speech production model, and an audio characteristic control unit adapted to perform a smoothing process using a window function needed for the re-synthesis while maintaining the tone color, namely, the audio characteristic.

The overall operation of this system is constituted by procedures of analyzing an input audio signal to vary the play-back speed while still maintaining the tone color or frequency of the audio signal, separating speech sources and audio characteristics from the audio signal based on the result of the analysis, processing the separated data at a varied play-back speed, and performing a signal re-synthesis using the processed data. These procedures are best shown in FIG. 4.

FIG. 4 shows signal processing procedures respectively carried out by the main parts of the speed-variable audio play-back apparatus shown in FIG. 2.

The analyzing, modulating and synthesizing parts, which are the most important parts of the present invention, correspond to the pitch detecting circuit 3, the pitch modulating unit 4 and the speech synthesizing circuit 5, respectively.

The above procedures will now be described in more detail in conjunction with the apparatus shown in FIG. 2.

Once an analog audio signal is input, it is converted into a digital signal by the A/D converter 1 and then sent to the pitch detecting circuit 3 via the input buffer 2.

In the procedure executed by the analyzing part, the pitch detecting circuit 3 separates the audio signal into a portion corresponding to the speech sources and a portion corresponding to the audio signal characteristics based on the speech production model under the control of the main controller 8. The pitch detecting circuit 3 processes the separated portions of the audio signal individually.

In order to derive the position of each speech source from the audio signal in this case, a cross-amplitude difference c(m,δ), which is indicative of a measured signal difference between the (m−1)th speech source and the mth speech source within a tolerance range δ is defined by the following equation (1):

$$c(m, \delta) = \sum_{n=0}^{N-1} |x(n + t(m-1)) - x(n + tm + \delta)| \quad (1)$$

where, x(n): an original input signal (the amount of speech on a time axis n);

tm: the position of the m-th speech source; and

δ: a tolerance region around tm

The cross-amplitude difference is defined as a measure of the similarity between signals by measuring the difference between signals using positions of adjacent speech sources as reference points.

Accordingly, the position of the m-th speech source is determined as the position tm where the cross-amplitude difference is minimized. As this procedure is repeatedly executed for input signals, the speech source components can be extracted.

Figure 5:
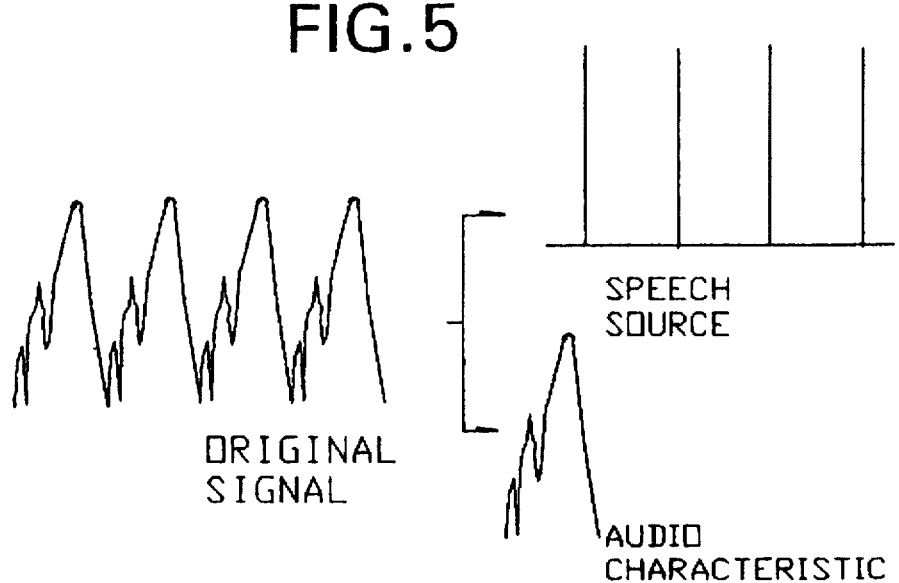
FIG. 5 is a waveform diagram showing waveforms of speech sources and audio characteristics separated in an analyzing procedure executed by the speed-variable audio play-back apparatus of FIG. 2.

FIG. 5 shows waveforms of the speech sources and audio characteristics separated in the procedure executed by the analyzing part.

Referring to FIG. 5, it can be seen that general audio signals have substantially similar characteristics in quasi-stationary time intervals, namely, neighboring short time intervals. The longest signal interval involving similar signal characteristics is typically called "one pitch". In the procedure executed by the analyzing part, a pitch interval of the speech source signal is extracted from the input audio signal so that it can be used to adjust the audio play-back speed.

The modulating part executes a procedure for modulating the speech source signal and audio characteristic signal separated in the above-mentioned analyzing procedure. In this regard, the pitch modulating unit 4 includes a speech source modulating unit for processing the speech source signal, and an audio characteristic control unit for executing a smoothing procedure based on the window function needed for a re-synthesis while maintaining the tone color, namely, the audio characteristic.

The speech source modulating unit of the pitch modulating unit 4 deletes or adds the speech source component extracted from the audio signal depending on the play-back speed, thereby adjusting the length of the audio signal. This will be described in more detail in conjunction with FIG. 6.

Figure 6:
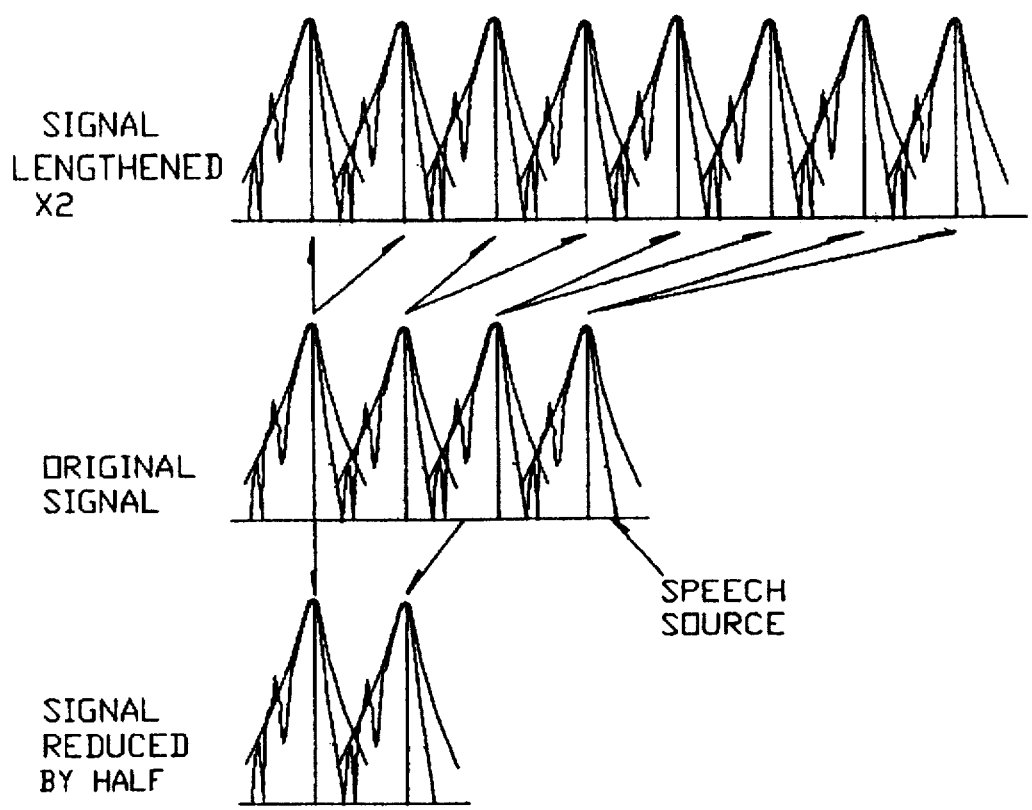
FIG. 6 is a waveform diagram showing a procedure for modulating the speech source by the speed-variable audio play-back apparatus of FIG. 2.

FIG. 6 illustrates an example of the procedure for modulating the speech sources by the speed-variable audio play-back apparatus shown in FIG. 2.

Where the audio play-back speed is to be decreased, additional speech sources are added while still maintaining the interval of neighboring speech sources, thereby lengthening audio signals. On the other hand, a doubling of the audio play-back speed is achieved by selecting every other speech source while still maintaining the interval of neighboring speech sources and re-synthesizing the selected speech sources using the audio characteristic.

The audio characteristic control unit of the pitch modulating unit 4 performs a signal modulation by applying a window function, which provides a certain signal length extending from the position of each speech source, to the audio signal portion corresponding to each audio signal characteristic as indicated by the following equation (2):

$$x_m(n) = h_m(t_m - n)x(n) \quad (2)$$

where, $x_m(n)$: a modulated audio signal;

$h_m(n)$: the window function;

$t_m$ : the position of each speech source; and x(n): an input audio signal (the amount of speech on a time axis n).

This procedure produces a smooth audio signal even when a signal modulation has been made by a deletion or addition of speech sources by a speech synthesis that will be described hereinafter.

Finally, the speech source synthesizing circuit 5, which executes a synthesizing procedure, derives a speed-varied speech signal x(n) by utilizing the speech source component and audio signal characteristic modulated in the modulating procedure. The derived speech signal x(n) can be expressed by the following equation (3):

$$x(n) = \frac{\sum_q \alpha_q xq(n) hq^2(tq - n)}{\sum_q hq^2(tq - n)} \quad (3)$$

where,

αq: a variable for adjusting the amount of synthesized speech;

xq(n): a modulated audio characteristic (xq(n)=$x_m$(n−δq));

tq: the position of each modulated speech source; and

δq: a variable for determining the play-back speed.

The speed-varied speech signal x(n) is sent to the D/A converter 7 via the output buffer 6. In the D/A converter 7, the speech signal x(n) is converted into an analog signal which is, in turn, output as an audio-out signal.

Where audio is played back using the above system, it can be heard as when a person speaks quickly or slowly even when the play-back speed is varied because the tone color of the speech being played back is maintained.

When videos are monitored or retrieved by high speed play-back in a VTR player, it is possible to obtain a played-back speech while maintaining the original tone color, as when a person speaks quickly or slowly, without causing listeners to feel uncomfortable by variations in tone color or loss of audio signals, both of which occur in existing VTR players.

The present invention is also suitable for high-speed scanning in multimedia equipment. This technique will become more widely used as the growth of the multimedia field continues.

As is apparent from the above description, the present invention provides a speed-variable audio play-back apparatus capable of playing back audio or speech stored in a storage medium at an adjusted speed while preventing any degradation in tone color and loss of audio signals from occurring upon varying the play-back speed while the audio or speech is played back by an audio play-back apparatus such as a tape player, VTR, multimedia equipment, computer and the like, so that the audio (speech) being played back can be heard as when a person speaks quickly or slowly.

Such effects of the present invention are useful in fields associated with design, manufacture and sale of various audio play-back apparatus.

Although the preferred embodiments of the invention have been disclosed for illustrative purposes, those skilled in the art will appreciate that various modifications and additions are possible, without departing from the scope and spirit of the invention as disclosed in the accompanying claims.

What is claimed is:

1. A speed-variable audio play-back apparatus comprising:
   a pitch detecting circuit for separating speech source components and audio characteristics from an input audio signal;
   a pitch modulating unit for modulating the input audio signal by modulating the separated speech source components and the audio characteristics separated by said pitch detecting circuit, the separated speech source components being modulated by performing one of deleting selected ones of the separated speech source components and adding at least one of the separated speech source components to the separated speech source components, depending on a play-back speed, thereby adjusting a length of an audio signal to be played back;
   a speech synthesizing circuit for synthesizing the speech source components modulated by said pitch modulating unit and the audio characteristics modulated by said pitch modulating unit, thereby producing a speed-varied audio signal; and
   a main controller for controlling said pitch detecting circuit, said pitch modulating unit, and said speech synthesizing circuit in accordance with control signals externally applied thereto, respectively.

2. The speed-variable audio play-back apparatus of claim 1, wherein the pitch detecting circuit is provided with an analog/digital converter for converting the input audio signal from an analog audio signal to a digital audio signal so that the pitch detecting circuit detects pitch portions of the digital audio signal in a digital manner.

3. The speed-variable audio play-back apparatus of claim 1, wherein the speech synthesizing circuit is provided with a digital/analog converter for converting the speed-varied audio signal into an analog signal.

4. The speed-variable audio play-back apparatus of claim 1, further comprising a memory unit for temporarily storing the input audio signal and sending the stored input audio signal to the speech synthesizing circuit so that the audio signal is compared with the speed-varied audio signal synthesized by the speech synthesizing circuit.

5. The speed-variable audio play-back apparatus of claim 1, further comprising a command memory circuit for storing various control signals required for producing the speed-varied audio signal, receiving control signals from the main controller and outputting the stored control signals respectively based on the received control signals.

6. The speed-variable audio play-back apparatus of claim 1, wherein the pitch detecting circuit separates the speech source components on the basis of the following equation:

$$c(m, \delta) = \sum_{n=0}^{N-1} |x(n + t(m-1)) - x(n + tm + \delta)|$$

where, x(n): the input audio signal (an amount of speech on a time axis n);

tm: a position of an m-th speech source;

$\delta$: a tolerance region around tm;

$c(m,\delta)$: a cross-amplitude difference.

7. The speed-variable audio play-back apparatus of claim 1, wherein the pitch modulating unit modulates the input audio signal by applying a window function which provides a required signal length extending from a position of each separated speech source component to a portion of the input audio signal corresponding to each audio signal characteristic as expressed by the following equation:

$$x_m(n) = h_m(t_m - n)x(n)$$

where, $x_m(n)$: the modulated input audio signal;

$h_m(n)$: the window function;

$t_m$: the position of each separated speech source is component; and x(n): the input audio signal (an amount of speech on a time axis n).

8. The speed-variable audio play-back apparatus of claim 1, wherein the speech synthesizing circuit derives the speed-varied audio signal by use of the modulated separated speech source components and the modulated audio signal characteristics as expressed by the following equation:

$$x(n) = \frac{\sum_q \alpha q \, xq(n) hq^2(tq - n)}{\sum_q hq^2(tq - n)}$$

where, x(n): the speed-varied audio signal;

$\alpha q$: a variable for adjusting an amount of synthesized speech;

xq(n): the modulated audio characteristics ($xq(n) = x_m(n - \delta q)$);

tq: a position of each modulated separated speech source; and $\delta q$: a variable for determining play-back speed.

* * * * *